United States Patent
Redshaw et al.

(10) Patent No.: US 10,210,651 B2
(45) Date of Patent: *Feb. 19, 2019

(54) ALLOCATION OF TILES TO PROCESSING ENGINES IN A GRAPHICS PROCESSING SYSTEM

(71) Applicant: Imagination Technologies Limited, Kings Langley (GB)

(72) Inventors: Jonathan Redshaw, St. Albans (GB); Yoong Chert Foo, London (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/038,564

(22) Filed: Jul. 18, 2018

(65) Prior Publication Data

US 2018/0322684 A1 Nov. 8, 2018

Related U.S. Application Data

(63) Continuation of application No. 15/386,145, filed on Dec. 21, 2016, now Pat. No. 10,055,877.

(30) Foreign Application Priority Data

Dec. 21, 2015 (GB) .................................. 1522540.2

(51) Int. Cl.
*G06F 9/50* (2006.01)
*G06T 1/20* (2006.01)
(Continued)

(52) U.S. Cl.
CPC ............ *G06T 15/005* (2013.01); *G06F 9/505* (2013.01); *G06F 9/5083* (2013.01); *G06T 1/20* (2013.01);
(Continued)

(58) Field of Classification Search
None
See application file for complete search history.

(56) References Cited

U.S. PATENT DOCUMENTS

| 5,794,016 A | 8/1998 | Kelleher |
| 6,651,082 B1 | 11/2003 | Kawase et al. |

(Continued)

FOREIGN PATENT DOCUMENTS

| EP | 1622391 A1 | 2/2006 |
| WO | 2009/068893 A1 | 6/2009 |

OTHER PUBLICATIONS

Inderpreet, "Cache Coherence for GPU Architectures," IEEE Micro, vol. 34, No. 3, pp. 69-79, May 2014, XP011550741.

(Continued)

*Primary Examiner* — Joni Richer
(74) *Attorney, Agent, or Firm* — Vorys, Sater, Seymour and Pease LLP; Vincent M DeLuca

(57) ABSTRACT

A graphics processing system processes primitive fragments using a rendering space which is sub-divided into tiles. The graphics processing system comprises processing engines configured to apply texturing and/or shading to primitive fragments. The graphics processing system also comprises a cache system for storing graphics data for primitive fragments, the cache system including multiple cache subsystems. Each of the cache subsystems is coupled to a respective set of one or more processing engines. The graphics processing system also comprises a tile allocation unit which operates in one or more allocation modes to allocate tiles to processing engines. The allocation mode(s) include a spatial allocation mode in which groups of spatially adjacent tiles are allocated to the processing engines according to a spatial allocation scheme, which ensures that each of the groups of (Continued)

spatially adjacent tiles is allocated to a set of processing engines which are coupled to the same cache subsystem.

20 Claims, 11 Drawing Sheets

(51) Int. Cl.
| | |
|---|---|
| *G06T 15/40* | (2011.01) |
| *G06T 15/00* | (2011.01) |
| *H04L 12/26* | (2006.01) |
| *H04L 29/08* | (2006.01) |
| *G06T 11/40* | (2006.01) |
| *G06T 17/10* | (2006.01) |
| *G06T 17/20* | (2006.01) |
| *G06T 15/80* | (2011.01) |
| *G06T 15/04* | (2011.01) |
| *G06T 1/60* | (2006.01) |

(52) U.S. Cl.
CPC ............... *G06T 1/60* (2013.01); *G06T 11/40* (2013.01); *G06T 15/04* (2013.01); *G06T 15/40* (2013.01); *G06T 15/80* (2013.01); *G06T 17/10* (2013.01); *G06T 17/20* (2013.01); *H04L 43/16* (2013.01); *H04L 67/2842* (2013.01); *G09G 2360/121* (2013.01); *G09G 2360/122* (2013.01)

(56) References Cited

U.S. PATENT DOCUMENTS

| | | | |
|---|---|---|---|
| 7,176,914 | B2 | 2/2007 | Emmot |
| 9,542,221 | B2 | 1/2017 | Harris et al. |
| 2006/0093044 | A1 | 5/2006 | Grantham et al. |
| 2006/0221087 | A1 | 10/2006 | Diard |
| 2010/0177105 | A1* | 7/2010 | Nystad .................... G06T 11/40 345/522 |
| 2010/0295851 | A1* | 11/2010 | Diamand .............. G06T 15/405 345/422 |
| 2012/0320069 | A1 | 12/2012 | Lee et al. |
| 2013/0076761 | A1 | 3/2013 | Ellis et al. |
| 2015/0022525 | A1 | 1/2015 | Grenfell |
| 2015/0170328 | A1 | 6/2015 | Redshaw |

OTHER PUBLICATIONS

NVIDIA Whitepaper, "NVIDIA's Next Generation CUDA Compute Architecture: Fermi," pp. 1-21, 2009, XP002693218, Jan. 1, 2009.

Sommefeldt, "A Look at the PowerVR Graphics Architecture: Tile-based Rendering—Imagination Technologies," pp. 1-10, Apr. 2015, XP055379938.

Note—NPL in parent application.

* cited by examiner

ALLOCATION OF TILES TO PROCESSING ENGINES IN A GRAPHICS PROCESSING SYSTEM

BACKGROUND

Graphics processing systems are typically configured to receive graphics data, e.g. from an application running on a computer system, and to render the graphics data to provide a rendering output. For example, the graphics data provided to a graphics processing system may describe geometry within a three dimensional (3D) scene to be rendered, and the rendering output may be a rendered image of the scene. Some graphics processing systems (which may be referred to as "tile-based" graphics processing systems) use a rendering space which is subdivided into a plurality of tiles. The "tiles" are regions of the rendering space, and may have any suitable shape, but are typically rectangular (where the term "rectangular" includes square). To give some examples, a tile may cover a 16×16 block of pixels or a 32×32 block of pixels of an image to be rendered. As is known in the art, there are many benefits to subdividing the rendering space into tiles. For example, subdividing the rendering space into tiles allows an image to be rendered in a tile-by-tile manner, wherein graphics data for a tile can be temporarily stored "on-chip" during the rendering of the tile, thereby reducing the amount of data transferred between a system memory and a chip on which a graphics processing unit (GPU) of the graphics processing system is implemented.

Tile-based graphics processing systems typically operate in two phases: a geometry processing phase and a rasterisation phase. In the geometry processing phase, the graphics data for a render is analysed to determine, for each of the tiles, which graphics data items are present within that tile. Then in the rasterisation phase, a tile can be rendered by processing those graphics data items which are determined to be present within that tile (without needing to process graphics data items which were determined in the geometry processing phase to not be present within the particular tile). The graphics data items may represent geometric shapes, which describe surfaces of structures in the scene, and which are referred to as "primitives". A common primitive shape is a triangle, but primitives may be other 2D shapes or may be lines or points also. Objects can be composed of one or more (e.g. hundreds, thousands or millions) of such primitives.

FIG. 1 shows some elements of a graphics processing system 100 which may be used to render an image of a 3D scene. The graphics processing system 100 comprises a graphics processing unit (GPU) 102 and two portions of memory $104_1$ and $104_2$. The two portions of memory $104_1$ and $104_2$ may, or may not, be parts of the same physical memory.

The GPU 102 comprises a pre-processing module 106, a tiling unit 108 and a rasterization module 110, wherein the rasterization module 110 comprises a hidden surface removal (HSR) unit 112 and a texturing/shading unit 114. The texturing/shading unit 114 comprises one or more processing engines which may be referred to as "Unified Shading Clusters" (USCs). The graphics processing system 100 is arranged such that a sequence of primitives provided by an application is received at the pre-processing module 106.

In a geometry processing phase, the pre-processing module 106 performs functions such as geometry processing including clipping and culling to remove primitives which do not fall into a visible view. The pre-processing module 106 may also project the primitives into screen-space. The primitives which are output from the pre-processing module 106 are passed to the tiling unit 108 which determines which primitives are present within each of the tiles of the rendering space of the graphics processing system 100. The tiling unit 108 assigns primitives to tiles of the rendering space by creating display lists for the tiles, wherein the display list for a tile includes indications of primitives which are present within the tile. The display lists and the primitives are outputted from the tiling unit 108 and stored in the memory $104_1$.

In a rasterisation phase, the rasterization block 110 fetches the display list for a tile and the primitives relevant to that tile from the memory $104_1$. The HSR unit 112 performs hidden surface removal to thereby remove fragments of primitives which are hidden in the scene. Methods of performing hidden surface removal are known in the art. The term "fragment" refers to a sample of a primitive at a sampling point, which is to be processed to render pixels of an image. In some examples, there may be a one to one mapping of fragments to pixels. In other examples there may be more fragments than pixels, and this oversampling can allow for higher quality rendering of pixel values, e.g. by facilitating anti-aliasing and other filtering that may be applied to multiple fragments for rendering each of the pixel values. The remaining fragments are passed from the HSR unit 112 to the texturing/shading unit 114 which performs texturing and/or shading on the fragments to determine pixel colour values of a rendered image which can be passed to the memory $104_2$ for storage in a frame buffer. The texturing/shading unit 114 may receive texture data from the memory $104_1$ in order to apply texturing to the primitive fragments, as is known in the art (e.g. by running a shader program). The texturing/shading unit 114 may apply further processing to the primitive fragments (e.g. alpha blending and other processes), as is known in the art in order to determine rendered pixel values of an image. The rasterization block 110 processes primitives in each of the tiles and when the whole image has been rendered and stored in the memory $104_2$, the rendered image can be outputted from the graphics processing system 100 and used in any suitable manner, e.g. displayed on a display or stored in memory or transmitted to another device, etc.

The texturing/shading unit 114 may include more than one processing engine which can process different data in parallel, thereby improving the efficiency of the texturing and/or shading performed by the texturing/shading unit 114. The rasterisation block 110 may be configured to render primitives for a single tile at a time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a graphics processing system configured to process primitive fragments using a rendering space which is sub-divided into a plurality of tiles, the system comprising: a plurality of processing engines configured to apply one or both of texturing and shading to primitive fragments; a cache system configured to store graphics data for use in processing the primitive fragments, the cache system including a plurality of cache subsystems, wherein each of said plurality of cache subsystems is coupled to a respective set of one or more of the processing engines; and a tile allocation unit configured to operate in one or more allocation modes to allocate tiles to the processing engines, wherein the one or more allocation modes include a spatial allocation mode in which groups of spatially adjacent tiles are allocated to the processing engines according to a spatial allocation scheme, said spatial allocation scheme ensuring that each of said groups of spatially adjacent tiles is allocated to a set of processing engines which are coupled to the same cache subsystem.

There is provided a method of processing primitive fragments in a graphics processing system using a rendering space which is sub-divided into a plurality of tiles, the method comprising: applying, at a plurality of processing engines, one or both of texturing and shading to primitive fragments; storing, in a cache system, graphics data for use in processing the primitive fragments, the cache system including a plurality of cache subsystems, wherein each of said plurality of cache subsystems is coupled to a respective set of one or more of the processing engines; and allocating, in one or more allocation modes, tiles to the processing engines, wherein the one or more allocation modes include a spatial allocation mode in which groups of spatially adjacent tiles are allocated to the processing engines according to a spatial allocation scheme, said spatial allocation scheme ensuring that each of said groups of spatially adjacent tiles is allocated to a set of processing engines which are coupled to the same cache subsystem.

There may be provided computer readable code adapted to perform the steps of any of the methods described herein when the code is run on a computer. The computer readable code may be encoded on a computer readable storage medium.

There may also be provided a method of manufacturing, at an integrated circuit manufacturing system, a graphics processing system according to any of the examples described herein. There may also be provided an integrated circuit definition dataset that, when processed in an integrated circuit manufacturing system, configures the system to manufacture a graphics processing system as described in any of the examples herein. The integrated circuit definition dataset may be stored on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
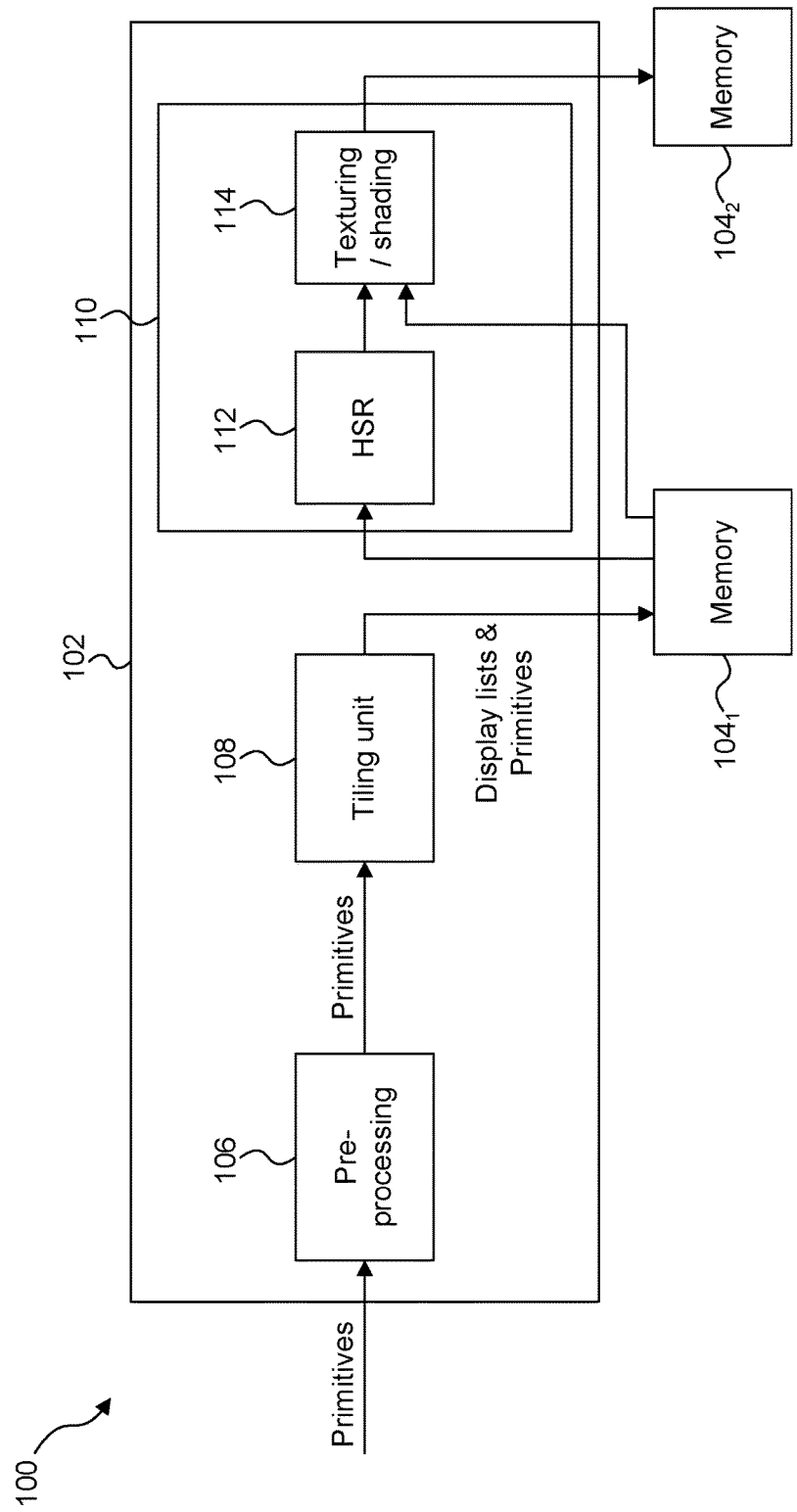
FIG. 1 shows an example of a prior art graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

Figure 2:
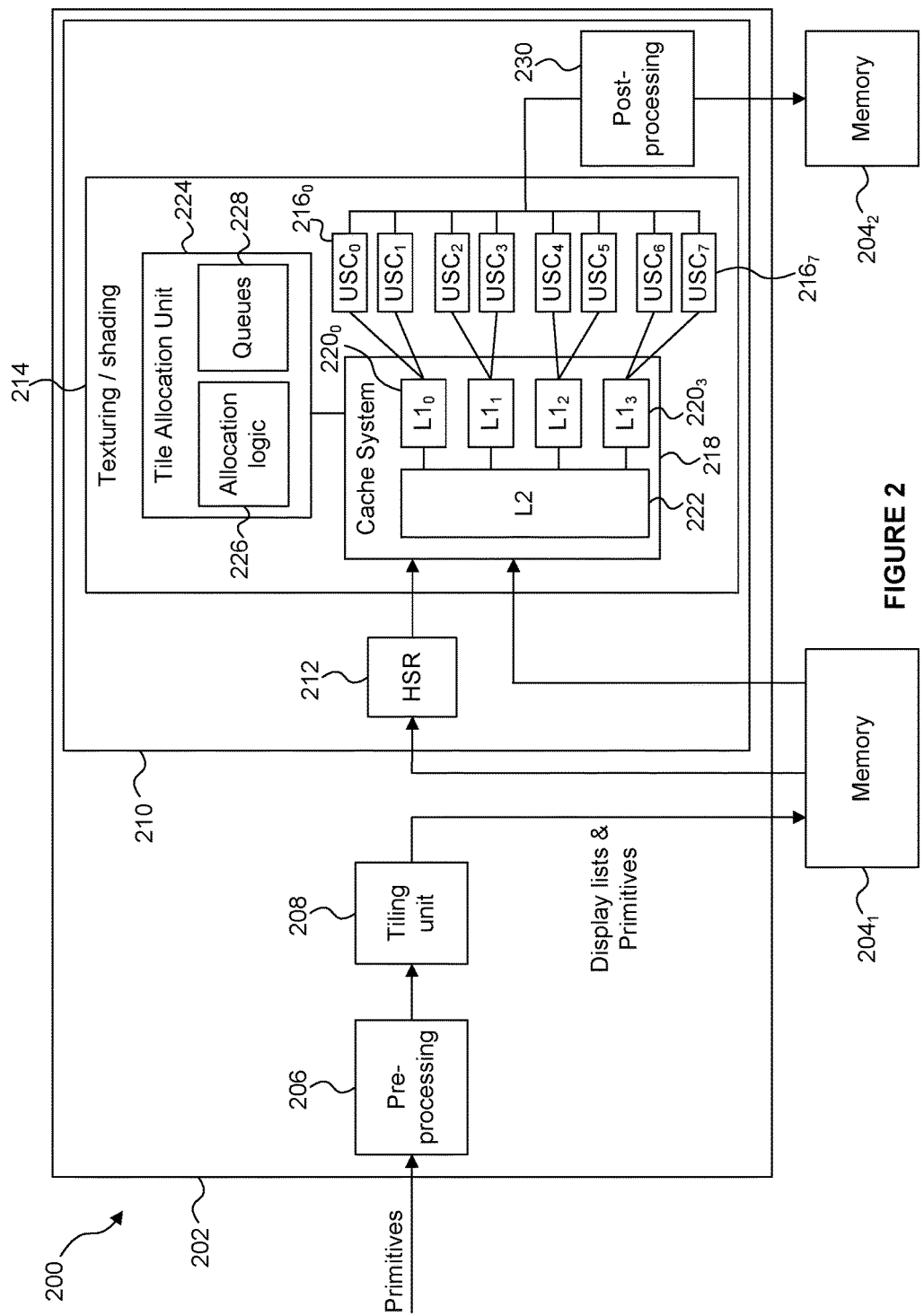
FIG. 2 shows a graphics processing system according to embodiments described herein.

FIG. 2 shows some elements of a graphics processing system 200 which may be used to render an image of a 3D scene. The graphics processing system 200 comprises a graphics processing unit (GPU) 202 and two portions of memory $204_1$ and $204_2$. It is noted that the two portions of memory $204_1$ and $204_2$ may, or may not, be parts of the same physical memory, and both memories $204_1$ and $204_2$ may be situated "off-chip", i.e. not on the same chip as the GPU 202. Communication between the memories ($204_1$ and $204_2$) and the GPU 202 may take place over a communications bus in the system 200. The graphics processing system may be embodied in hardware (e.g. on an integrated circuit), in software or a combination of both.

The GPU 202 comprises a pre-processing module 206, a tiling unit 208 and a rasterization module 210, wherein the rasterization module 210 comprises a hidden surface removal (HSR) unit 212, a texturing/shading unit 214 and a post-processing module 230. The texturing/shading unit 214 comprises a plurality of processing engines 216, which may be referred to as "Unified Shading Clusters" (USCs). FIG. 2 shows eight processing engines $216_0$ to $216_7$, wherein for clarity only two of them are referenced with reference numerals in FIG. 2. Each of the processing engines 216 is configured to apply one or both of texturing and shading to primitive fragments. The texturing/shading unit 214 also comprises a cache system 218 which is configured to store graphics data relating to primitive fragments. The cache system 218 is a multi-level cache. The cache system 218 comprises a plurality of level 1 cache subsystems 220 and a level 2 cache 222. In the example shown in FIG. 2 there are four level 1 cache subsystems $220_0$ to $220_3$, wherein for clarity only two of them are referenced with reference numerals in FIG. 2. The texturing/shading unit 214 also comprises a tile allocation unit 224 which comprises allocation logic 226 and a set of queues 228 for storing indications of tiles which are allocated to the processing engines. The operation of the tile allocation unit 224 is described in detail below.

The geometry processing phase implemented by the graphics processing system 200 may be the same as that implemented by graphics processing system 100 described above. Therefore, the pre-processing module 206 performs functions such as clipping/culling and projection of the primitives into screen-space. The tiling unit 208 determines which primitives are present within each of the tiles of the rendering space of the graphics processing system 200 and assigns primitives to tiles of the rendering space by creating display lists for the tiles, wherein the display list for a tile includes indications of primitives which are present within the tile. The display lists and the primitives are outputted from the tiling unit 208 and stored in the memory 204$_1$. The display lists provide data to the rasterisation module 210 for use in rendering the primitive fragments within the respective tiles in the rasterisation phase. As an example, the display lists may include a region header, control streams and vertex blocks. The region header is an array of pointers to the heads of per-tile control streams. A control stream is a per-tile list of pointers to vertex blocks and a list of primitives within the vertex block which are present within the respective tile. A vertex block includes indices for primitives, where the indices point to vertex data contained within the same vertex block (i.e. a local index within the context of the vertex block).

In contrast to the graphics processing system 100 described above with reference to FIG. 1, the graphics processing system 200 can have "multiple tiles in flight" in the rasterisation module 210, i.e. multiple tiles for which the primitives are partially processed at a given time. For example, the HSR unit 212 may comprise a plurality of depth buffers configured to store depth data for a respective plurality of tiles, such that it is able to switch between processing primitives from different tiles before finishing the processing of all of the primitives within a tile. This allows greater flexibility in the order in which the primitives are processed by the rasterisation module 214, which can lead to more efficient processing of the primitives by the graphics processing system 200 compared to the processing performed by the graphics processing system 100 in which all of the primitives of one tile are processed by the rasterisation unit 110 before any of the primitives of the next tile are processed by the rasterisation unit 110. For example, if the processing of a tile stalls for some reason that is specific to the tile being processed, then the rasterisation unit 210 of the graphics processing system 200 can continue to process primitives from other tiles, whereas the rasterisation unit 110 of the graphics processing system 100 may be stalled until the processing can resume for the stalled tile. As described in more detail below with reference to FIGS. 12 and 13, the HSR unit may include more than one HSR module which can perform HSR on different tiles in parallel.

In the graphics processing system 200, where there are multiple tiles in flight, it can be efficient to use the same processing engine 216 for applying texturing/shading to all of the visible primitives within a particular tile. That is, a tile can be allocated for processing by one of the processing engines 216, rather than using more than one of the processing engines 216 to process the graphics data for a particular tile. This can be beneficial because each primitive in a tile may cause texturing data for that primitive to be loaded into the local cache subsystem 220 of the processing engine 216. By processing primitive fragments from a tile in a single processing engine 216, the texturing/shading data for the primitives in that tile might only need to be loaded into the cache subsystem of that processing engine 216. In contrast, if the primitive fragments from a tile were distributed to several processing engines, the same texturing/shading data would be more likely to be replicated in several of the cache subsystems 220. Furthermore, if the primitive fragments from a tile were distributed to several processing engines there may be coherency problems for the data, e.g. if different processing engines process primitives at the same sample position.

In some systems, tiles are allocated to processing engines for processing thereon in accordance with a load balancing allocation scheme. In this way, tiles may be allocated to processing engines with a view to preventing any of the processing engines becoming idle, which can help to maintain the rate at which the texturing/shading unit 214 processes tiles. However, according to these load balancing schemes tiles may be allocated to processing engines without regard to the spatial position of the tiles, and as described below this can lead to inefficiencies in the cache usage.

Figure 3:
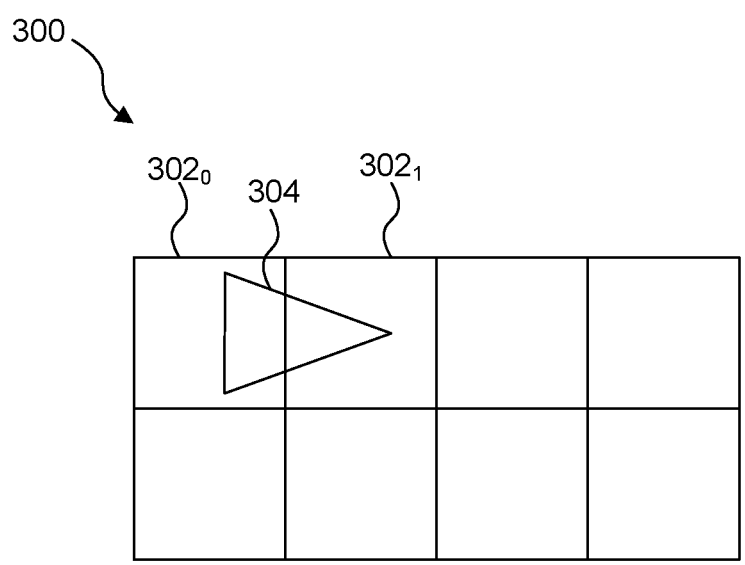
FIG. 3 represents a primitive within a block of tiles.

An individual primitive may be present within more than one tile. For example, FIG. 3 shows a 2×4 block of tiles 300 within a rendering space, wherein a primitive 304 is present within two tiles: tile 302$_0$ and 302$_1$. Therefore, graphics data for the primitive 304 will be written into cache subsystems used by processing engines which process tiles 302$_0$ and 302$_1$. As will be apparent, a primitive may cover many more than two tiles within the rendering space.

In examples described herein, each of the processing engines shares a L1 cache subsystem with one or more (but not all) of the other processing engines. That is, each of the L1 cache subsystems is coupled to a respective set of one or more of the processing engines. For example, in the texturing/shading unit 214 shown in FIG. 2, each of the cache subsystems 220$_0$ to 220$_3$ is coupled to a respective set of two of the processing engines 216$_0$ to 216$_7$. In particular, the cache subsystem 220$_0$ is coupled to the processing engines 216$_0$ and 216$_1$; the cache subsystem 220$_1$ is coupled to the processing engines 216$_2$ and 216$_3$; the cache subsystem 220$_2$ is coupled to the processing engines 216$_4$ and 216$_5$; and the cache subsystem 220$_3$ is coupled to the processing engines 216$_6$ and 216$_7$. The cache subsystems 220 are configured to store graphics data relating to primitive fragments processed by the respective sets of processing engines to which they are coupled. For example, the graphics data may be texture data to be applied to the primitive fragments.

Each of the cache subsystems 220 is configured to store graphics data relating to the primitive fragments of tiles which are allocated to a processing engine 216 to which that cache subsystem 220 is coupled. The graphics data may be referred to as "primitive data". The graphics data is data that is used by the processing engines 216 for applying one or both of texturing and shading to the primitive fragments. In general, the graphics data may include any data for use in processing primitive fragments. The graphics data may be referred to as "varying data", and may comprise data values associated with vertices which may or may not be interpolated or iterated across the surface of the primitive to calculate a per-fragment value. The graphics data may be used for any suitable purpose in a fragment shader running on processing engine. For example, the graphics data could be colour data, a coordinate for accessing a texture, distance data (which may be used for lighting or shadows or bump mapping or something else), opacity data (which can be referred to as "alpha" data) or simply a data value to be used in some arbitrary calculation (e.g. for use in an algorithm for creating a particular effect). The graphics data may also include other data to be used for processing the primitive fragments, such as texture data of a texture to be applied to the primitive fragments.

A problem with the load balancing allocation scheme can be illustrated with an example. According to the load balancing scheme, the tiles $302_0$ and $302_1$ shown in FIG. 3 may be allocated, for example, to processing engines $216_0$ and $216_5$ respectively. Since the processing engine $216_0$ is coupled to the cache subsystem $220_0$ and the processing engine $216_5$ is coupled to the cache subsystem $220_2$, graphics data for the primitive 304 (which is present within tiles $302_0$ and $302_1$) may be stored in the cache subsystems $220_0$ and $220_2$. Therefore, the graphics data for primitive 304 may be duplicated for storage in two L1 cache subsystems. This duplication represents inefficient usage of the cache system 218. As more data gets duplicated in L1 cache subsystems, other data is pushed out of an L1 cache subsystem. This makes it more likely that data is fetched back into L1, preferably from the L2 cache 222, but maybe also from a higher level memory, e.g. main memory $204_1$ or an L3 cache or whatever the L2 cache is connected to.

Examples described herein can improve the cache efficiency compared to systems which solely implement a load balancing scheme for allocating tiles to processing engines. In particular, examples described herein make use of a spatial allocation scheme which allocates tiles to processing engines based on the spatial positions of the tiles and the coupling of the cache subsystems to the processing engines. That is, the allocation of tiles to the processing engines 216 matches the structure of the cache system 218. As described in more detail below the tile allocation unit 224 can operate in a spatial allocation mode in which groups of spatially adjacent tiles are allocated to the processing engines 216 according to the spatial allocation scheme to ensure that each of the groups of spatially adjacent tiles is allocated to a set of processing engines 216 which are coupled to the same cache subsystem 220.

Figure 4:
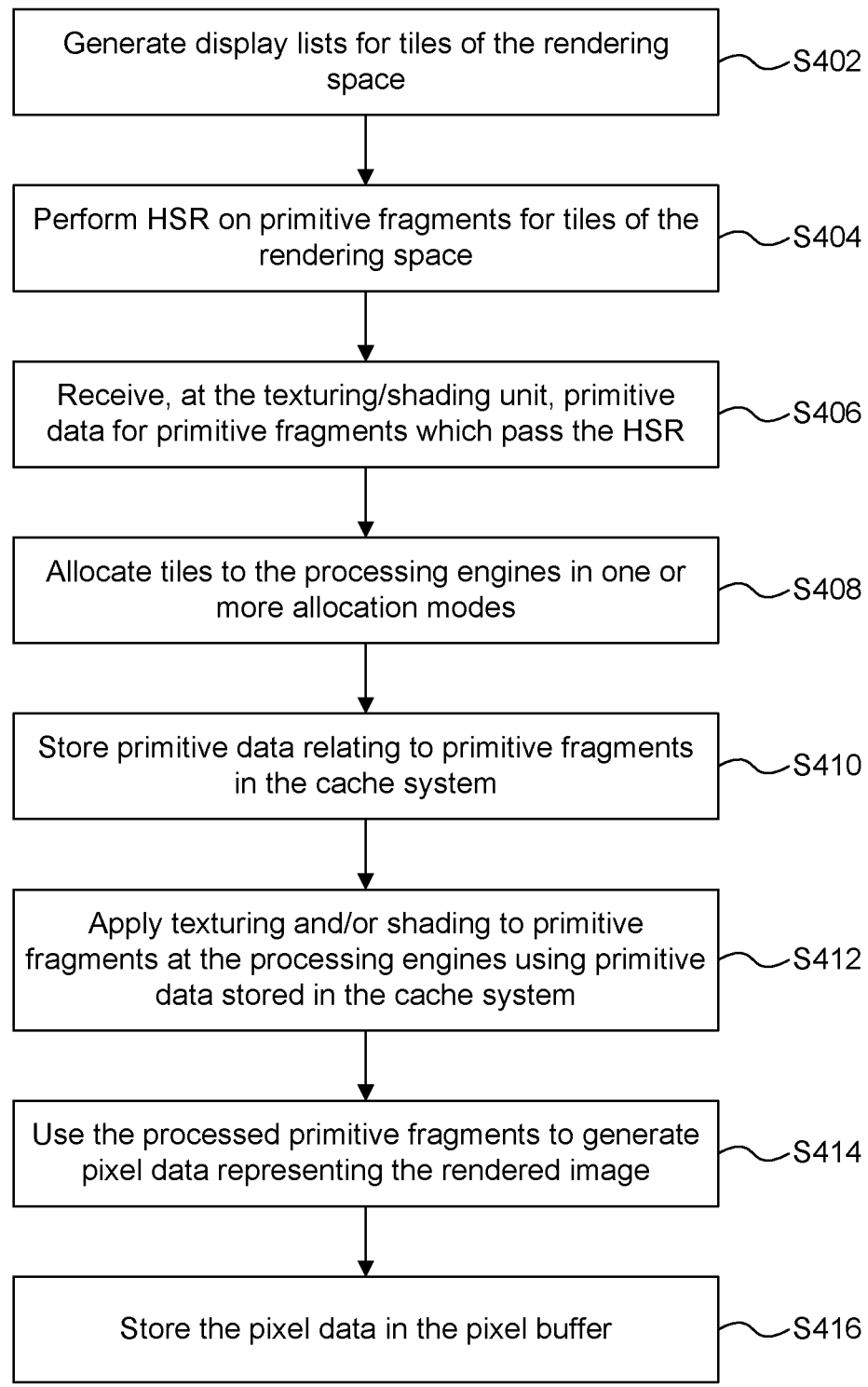
FIG. 4 is a flow chart showing a method of processing primitive fragments in a graphics processing system.

With reference to the flow chart shown in FIG. 4, there is described a method of processing primitives in the graphics processing system 200. In step S402, a geometry processing phase is implemented, as described above, such that the tiling unit 208 generates display lists (or control streams) for the tiles of the rendering space. As described above, the display list for a tile includes indications of primitives which are present within the tile. The display lists and the primitives are outputted from the tiling unit 208 and stored in the memory $204_1$.

In the rasterisation phase, the display lists and graphics data for the primitives are provided to the rasterisation module 210. The graphics processing system 200 shown in FIG. 2 is a deferred rendering system so hidden surface removal is applied before texturing and/or shading is applied to primitive fragments. Other graphics processing systems may be non-deferred rendering systems (e.g. immediate mode rendering systems), and in those systems texturing and/or shading is applied before hidden surface removal is applied to primitive fragments.

In step S404 the HSR unit 212 performs hidden surface removal on primitive fragments for tiles of the rendering space. For processing a particular tile, the HSR unit 212 may receive position data for primitives which are indicated by the display list for the particular tile as being present within that tile. The HSR unit 212 uses the position data for the primitives to determine whether primitive fragments at sample positions within the tile are hidden from view by other primitives. Methods of performing hidden surface removal are known in the art, and as such are not described in great detail herein. However, as a brief and simplistic explanation, hidden surface removal may involve performing depth tests on primitive fragments against a depth buffer, and if the primitive fragment passes the depth test it is maintained, whereas if the primitive fragment fails the depth test it is removed. The depth buffer may be maintained to store, at each sample position, a depth value of the latest primitive fragment to have passed the depth test at that sample position. Hidden surface removal can be more complex than this, e.g. if primitives are not completely opaque, but the details of such complex hidden surface removal techniques are beyond the scope of this disclosure. Primitive fragments which pass the HSR are provided to the texturing/shading unit 214.

In step S406, the texturing/shading unit 214 receives graphics data (e.g. texture data) for primitive fragments which pass the HSR performed by the HSR unit 212. For example, the HSR unit 212 may provide, to the texturing/shading unit 214, indications (or "tags") of which primitives have passed the HSR (and therefore may be visible) at each sample position within a tile. The texturing/shading unit 214 can retrieve graphics data for the indicated primitives from the memory $204_1$. The graphics data retrieved may include position data for the primitives, as well as attribute data to be applied to the primitives, e.g. a texture to be applied to the primitives.

As mentioned above, a tile may be allocated to a processing engine 216, rather than processing a tile using more than one of the processing engines 216. In step S408 the tile allocation unit 224 allocates tiles to the processing engines 216. The tile allocation unit 224 is configured to operate in one or more allocation modes, including a spatial allocation mode in which groups of spatially adjacent tiles are allocated to the processing engines according to a spatial allocation scheme. As mentioned above, the spatial allocation scheme ensures that each of a plurality of groups of spatially adjacent tiles is allocated to a set of processing engines 216 which are coupled to the same cache subsystem 220. For example, with reference to FIG. 3, tiles $302_0$ and $302_1$ are spatially adjacent tiles and may be in the same group of spatially adjacent tiles, such that these tiles will be allocated to a set of processing engines (e.g. processing engines $216_0$ and $216_1$) which are coupled to the same cache subsystem (e.g. cache subsystem $220_0$). In this case, the graphics data for primitive 304 can be stored in the cache subsystem $220_0$ which is coupled to the processing engines of the set. The graphics data for primitive 304 does not need to be stored in any of the other cache subsystems (e.g. cache subsystems $220_1$, $220_2$ or $220_3$). Therefore, there is no duplication of the graphics data for primitive 304 across different cache subsystems 220, and it is less likely that other graphics data will need to be re-fetched from the L2 cache 222. The processing involved in the allocation of tiles to processing engines is performed by the allocation logic 226 of the tile allocation unit 224. Furthermore, it is noted that a texture may be mapped across multiple primitives. If the texture data is stored in a cache subsystem 220 for use in rendering more than one primitive, the cache system 218 maintains cache coherency of the texture data for use in rendering the different primitives. Such cache coherency is easier to maintain if the processing engines which are processing the primitives using the texture data share a common cache subsystem 220. This is more likely to be the case when adjacent tiles are allocated to processing engines 216 which share a cache subsystem 220.

In situations where primitives are present in more than one tile, the spatial allocation of sets of spatially adjacent tiles to processing engines coupled to the same cache subsystem, reduces the likelihood of graphics data being needed by processing engines 216 which are not coupled to the same cache subsystem 220 compared to allocating tiles to processing engines in accordance with a load balancing scheme. Further examples of the allocation of tiles to processing engines are described below.

In step S410, the graphics data for the primitives which are present in a tile is stored in the cache system 218. In particular, the graphics data for the primitives which are present in a tile is stored in the cache subsystem 220 coupled to the processing engine(s) 216 to which the tile has been allocated.

In step S412 the processing engines 216 process primitive fragments by applying one or both of texturing and shading to the primitive fragments. The processing engines 216 use the graphics data (e.g. texture data) stored in the cache system 218 to process the primitive fragments. As described above, tiles are allocated to the processing engines 216 such that each of the processing engines 216 processes the primitive fragments of a tile allocated to that processing engine 216.

The graphics processing system 200 may be for use in rendering an image, and the processing engines 216 may output processed primitive fragments for use in generating pixel data representing the rendered image. For example, in step S414 the post-processing module 230 can apply post-processing steps such as filtering to the processed primitive fragments outputted from the texturing/shading unit 214 to generate the pixel data representing the rendered image. The post-processing module 230 may also compress the pixel data of the rendered image before it is stored. As will be apparent, the post-processing applied by the post-processing module 230 may include any other suitable process, such as format conversion, gamma compression, colour space conversion or format packing.

In step S416 the pixel data (which may be compressed) is outputted from the post-processing module 230 and stored, e.g. in a pixel buffer in the memory $204_2$.

Figure 5:
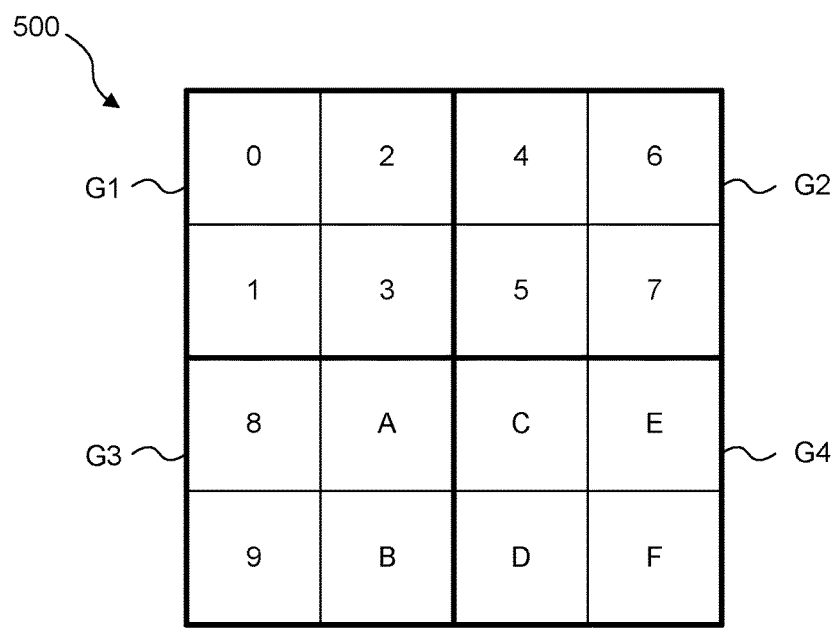
FIG. 5 shows a block of tiles to be allocated to processing engines.

The allocation of the tiles to the processing engines 216 is described in more detail below. In the spatial allocation mode, the tile allocation unit 224 allocates a block of tiles to the processing engines ($216_0$ to $216_7$) in one allocation process. In this way, a respective one or more tiles from the block of tiles is allocated to each of the processing engines 216. For example, in one allocation process an equal number of tiles from the block may be allocated to each of the processing engines 216. The block of tiles comprises a plurality of groups of spatially adjacent tiles to be allocated to different sets of processing engines coupled to respective cache subsystems 220. For example, FIG. 5 shows a block of tiles 500. The block of tiles 500 is a 4×4 block of tiles. In FIG. 5, each of the tiles in the block 500 is labelled with a hexadecimal digit (0 to F) so that the different tiles in the block 500 can be referred to easily. In this example, the block of tiles comprises four 2×2 groups of spatially adjacent tiles (denoted G1, G2, G3 and G4 in FIG. 5). By allocating a whole block of tiles in one allocation process, it can be ensured that the spatial allocation of the tiles to the processing engines matches the structure of the cache system 218. In this way, the decisions as to which processing engine to allocate each of the tiles in the block to, are performed substantially at the same time. As will be apparent from the description below, allocating the tiles of the block 500 to the processing engines 216 in one allocation process (i.e. substantially simultaneously) does not necessarily mean that the tiles of the block 500 will be processed simultaneously by the processing engines 216.

Figure 6:
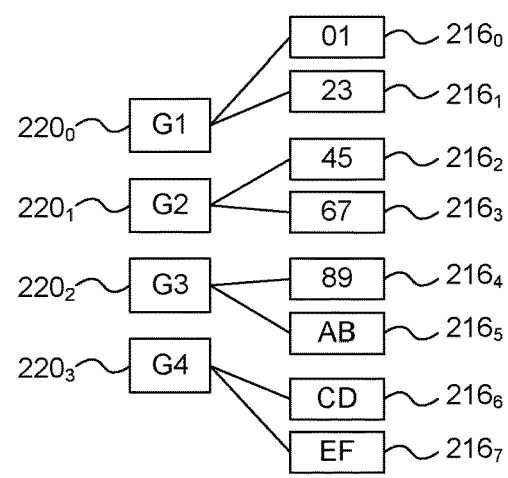
FIG. 6 indicates an allocation of tiles from the block to the processing engines.

FIG. 6 illustrates how the tile allocation unit 224 allocates the tiles of the block 500 to the processing engines 216 according to the spatial allocation scheme. The first group of tiles (G1) is allocated to the processing engines $216_0$ and $216_1$ which are coupled to the cache subsystem $220_0$, such that tiles 0 and 1 are allocated to the processing engine $216_0$ and tiles 2 and 3 are allocated to the processing engine $216_1$. The second group of tiles (G2) is allocated to the processing engines $216_2$ and $216_3$ which are coupled to the cache subsystem $220_1$, such that tiles 4 and 5 are allocated to the processing engine $216_2$ and tiles 6 and 7 are allocated to the processing engine $216_3$. The third group of tiles (G3) is allocated to the processing engines $216_4$ and $216_5$ which are coupled to the cache subsystem $220_2$, such that tiles 8 and 9 are allocated to the processing engine $216_4$ and tiles A and B are allocated to the processing engine $216_5$. The fourth group of tiles (G4) is allocated to the processing engines $216_6$ and $216_7$ which are coupled to the cache subsystem $220_3$, such that tiles C and D are allocated to the processing engine $216_6$ and tiles E and F are allocated to the processing engine $216_7$. It can be appreciated that each 2×2 group of tiles (G1 to G4) is allocated to a pair of processing engines 216 which are coupled to the same cache subsystem 220. Therefore, in this example, each processing engine 216 of a pair is allocated two tiles from the group of tiles allocated to that pair of processing engines 216. In other examples, a different number of tiles (e.g. 1 or 3 or more tiles) may be allocated to each processing engine in each allocation process.

In this example, each processing engine is allocated two tiles from the block 500 in one allocation process. A processing engine 216 may process data from one tile at a time, so processing engine $216_0$ starts to process tile 0 and will attempt to complete the processing of tile 0 before starting to process tile 1. However, if for some reason, the processing of tile 0 stalls before it is completed, the processing engine $216_0$ can perform some processing of tile 1 before the processing of tile 0 has completed. The other processing engines 216 operate in a similar manner. Therefore, as an example, tiles 0 and 2 will tend to be processed concurrently by the respective processing engines $216_0$ and $216_1$, and the tiles 1 and 3 will tend to be processed concurrently by the respective processing engines $216_0$ and $216_1$. Both processing engines $216_0$ and $216_1$ are coupled to cache subsystem $220_0$ so if, for example, a primitive (such as primitive 304) is present in both tiles 0 and 2 then both the processing engines $216_0$ and $216_1$ can access the graphics data for the primitive from the cache subsystem $220_0$.

The allocation of tiles from a block to the processing engines as shown in FIGS. 5 and 6 provides a good distribution of the tiles to the processing engines 216. In an alternative example, tiles 0 and 2 may be allocated to processing engine $216_0$; tiles 1 and 3 may be allocated to processing engine $216_1$; tiles 4 and 6 may be allocated to processing engine $216_2$; tiles 5 and 7 may be allocated to processing engine $216_3$; tiles 8 and A may be allocated to processing engine $216_4$; tiles 9 and B may be allocated to processing engine $216_5$; tiles C and E may be allocated to processing engine $216_6$; and tiles D and F may be allocated to processing engine $216_7$. This allocation of tiles would also be in accordance with the spatial allocation scheme in that each of the groups of tiles (G1 to G4) is allocated to a respective set of processing engines 216 coupled to the same cache subsystem 220. However, this would tend to result in different tiles being processed concurrently. For example, tiles 0 and 1 would then tend to be processed concurrently by processing engines $216_0$ and $216_1$ and then tiles 2 and 3 would tend to be processed concurrently by processing engines $216_0$ and $216_1$. In user interface use cases, such as video com positing, a significant proportion of the graphics data may be stride-based texture data, and there may therefore be a slight preference for allocating the tiles as shown in FIG. 6 because if horizontal pairs of tiles tend to be processed concurrently, the cache hit rate for reading the texture data from the cache system 218 may, on average, be slightly higher than if vertical pairs of tiles tend to be processed concurrently.

It can be appreciated that the spatial allocation scheme for allocating tiles to the processing engines in accordance with the structure of the cache system 218 can improve the cache hit rate compared to the load balancing allocation scheme. This can be beneficial in terms of reducing the amount of data transferred between the GPU 202 and the memory $204_1$ (which may be an off-chip memory), and reducing the amount of data transferred between different levels of the cache hierarchy. It can also be beneficial in terms of the processing speed and power consumption of the texturing/shading unit 214.

However, there is a trade-off between the efficiency of the cache system 218 and the balancing of the load across the different processing engines. In particular, it may reduce the efficiency of the texturing/shading unit 214 if any of the processing engines 216 become idle when there is processing ready to be performed. Therefore, in some scenarios it may be beneficial to revert back to a load balancing allocation mode to avoid any of the processing engines becoming idle.

Therefore, the tile allocation unit 224 can be operated in a load balancing allocation mode in which tiles are allocated to the processing engines 216 based on computational loads of the processing engines 216. In particular, if the load on any of the processing engines 216 drops below a threshold level then one or more tiles can be allocated to that processing engine 216 to thereby increase the load on that processing engine 216. This can be done with a view to maintaining approximately the same computational load on each of the processing engines 216.

Figure 7:
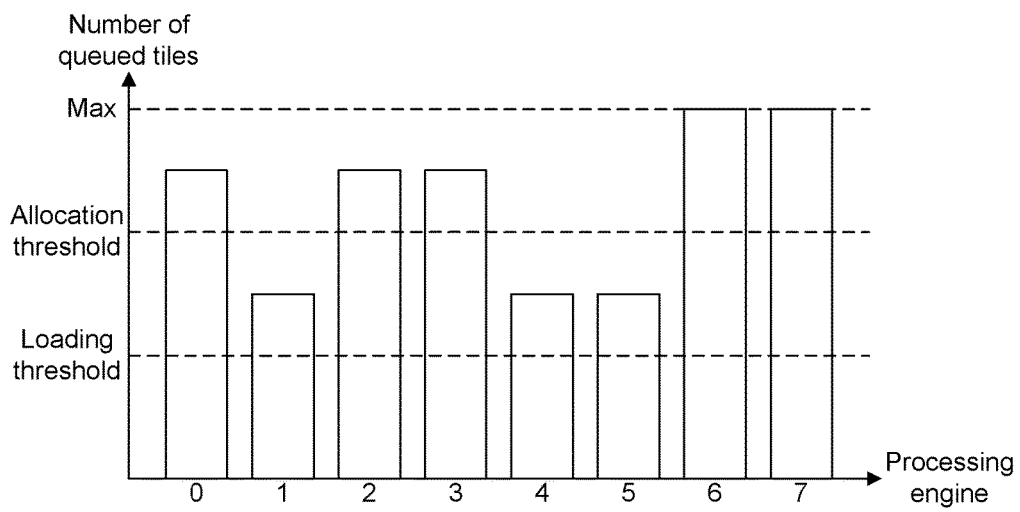
FIG. 7 illustrates a first state of queues of tiles allocated to processing engines.

The tile allocation unit 224 includes a set of queues 228. The tile allocation unit 224 (in particular the allocation logic 226 of the tile allocation unit 224) maintains, for each of the processing engines 216, a queue of allocated tiles which are allocated for processing by that processing engine 216. FIG. 7 illustrates a state of the queues 228 of tiles allocated to the eight processing engines $216_0$ to $216_7$. It is noted that the queues 228 contain indications (e.g. tile IDs) of the tiles allocated to the respective processing engines 216, rather than storing the actual tile data for rendering the tiles. The graph shown in FIG. 7 illustrates the number of tiles in the queue for each of the processing engines 216. When a tile has been processed by a processing engine 216 the tile is removed from the queue for that processing engine 216; and when a tile is allocated to a processing engine 216, the tile is added to the queue for that processing engine 216. Therefore, the queues show the tiles that have been allocated to the processing engines 216 but which have not yet been completely processed by the processing engines 216. In some other examples, a tile may be removed from a queue for a processing engine when the processing starts processing that tile. When a processing engine 216 is ready to start processing a new tile, the tile allocation unit 224 determines which tile the processing engine 216 is to process next by querying the appropriate queue 228. The queues may operate in a First In First Out (FIFO) manner, or according to any other suitable queuing scheme.

As shown in FIG. 7, there is a maximum to the number of tiles which can be allocated to a processing engine at any given time. This maximum is shown with the dashed line ("Max") in FIG. 7. As an example, the maximum number may be six. In other examples, the maximum may be set to a different number. Setting a maximum to the number of tiles that can be allocated to a processing engine prevents the processing of the tiles on different processing engines from straying too far out of sync with each other. This helps to ensure that spatially adjacent tiles that are processed by different processing engines are processed at approximately the same time. As an example, keeping the processing of two spatially adjacent tiles temporally close together on two different processing engines 216 which share a cache subsystem 220 increases the likelihood that graphics data in the cache subsystem 220 which is useful for both of the tiles can be used by the different processing engines before it is evicted from the cache subsystem 220. The cache subsystem may for example operate according to a Least Recently Used (LRU) cache eviction policy. Other cache eviction policies may be used.

FIG. 7 also shows an "allocation threshold" and a "loading threshold". These are thresholds to the number of tiles in the queues and are used to control the allocation mode in which the tile allocation unit 224 operates, as described below. The allocation threshold is higher than the loading threshold. For example, the allocation threshold may be four, and the loading threshold may be two, but in other examples the thresholds may take different values. The values of the maximum, the allocation threshold and the loading threshold may be fixed or variable. As will become apparent from the description below, if the queues are in the state shown in FIG. 7 (with at least one queue above the allocation threshold and with no queues below the loading threshold) then no tiles will be allocated to the processing engines at that time, and the processing engines will continue to process tiles that are queued for the processing engines.

Figure 8:
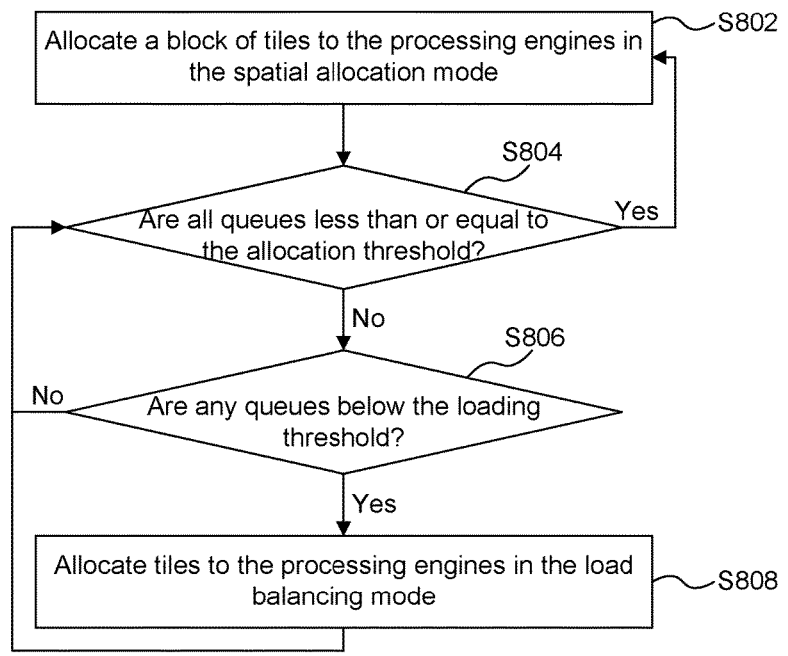
FIG. 8 is a flow chart showing a method of allocating tiles to processing engines.

The operation of the tile allocation unit 224 is described with reference to the flow chart shown in FIG. 8. The tile allocation unit 224 monitors the state of the queues to determine an allocation mode in which tiles are to be allocated to the processing engines 216. Initially, when the queues 228 are empty, the tile allocation unit 224 operates in the spatial allocation mode. In step S802, a block of tiles is allocated to the processing engines 216 as described above such that groups of spatially adjacent tiles are allocated to respective sets of processing engines 216 which are coupled to the same cache subsystems 220. For example, the allocation of a block of tiles (e.g. block 500) may result in allocating two tiles to each of the processing engines 216.

In step S804, the tile allocation unit 224 (e.g. the allocation logic 226) determines whether all of the queues are less than or equal to the allocation threshold. In other words, in step S804, the tile allocation unit 224 (e.g. the allocation logic 226) determines whether the number of allocated tiles in each of the queues is not greater than the allocation threshold. If in step S804 it is detected that the number of allocated tiles in each of the queues 228 is not greater than the allocation threshold, then the method passes to step S802 and an allocation process is implemented in the spatial allocation mode, as described above, to thereby allocate a block of tiles to the processing engines 216. In this way, the tiles are allocated to processing engines to match the spatial location of the tiles with the structure of the cache system

Figure 9:
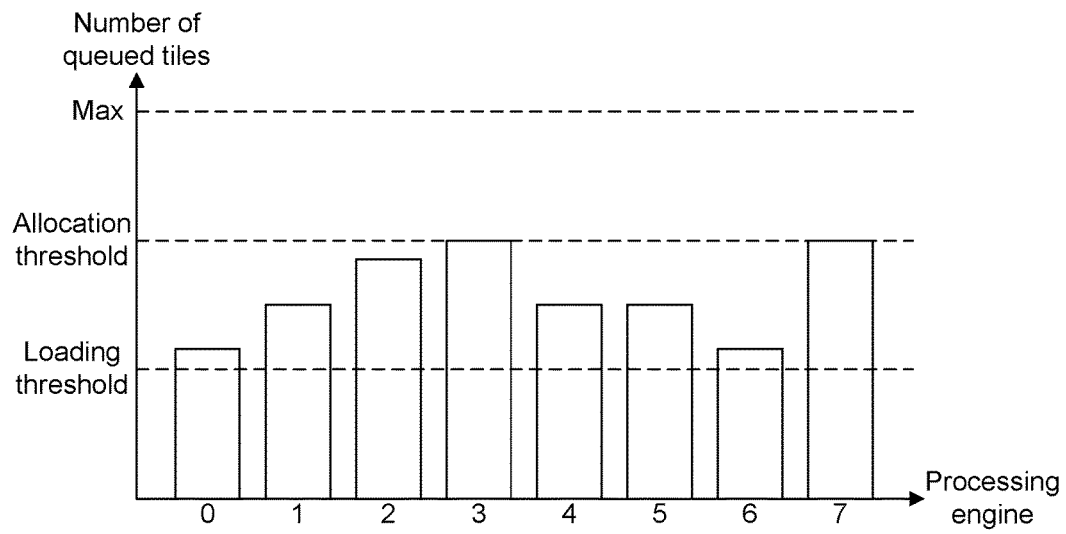
FIG. 9 illustrates a second state of the queues of tiles allocated to the processing engines.

218. FIG. 9 shows an example in which none of the queues are above the allocation threshold, such that the method passes from step S804 to step S802 so that a block of tiles is allocated to the processing engines 216 in the spatial allocation mode.

In some examples, the difference between the maximum number of tiles that can be included in a queue and the allocation threshold is equal to the number of tiles that are allocated to each processing engine when a block of tiles is allocated to the processing engines.

Figure 10:
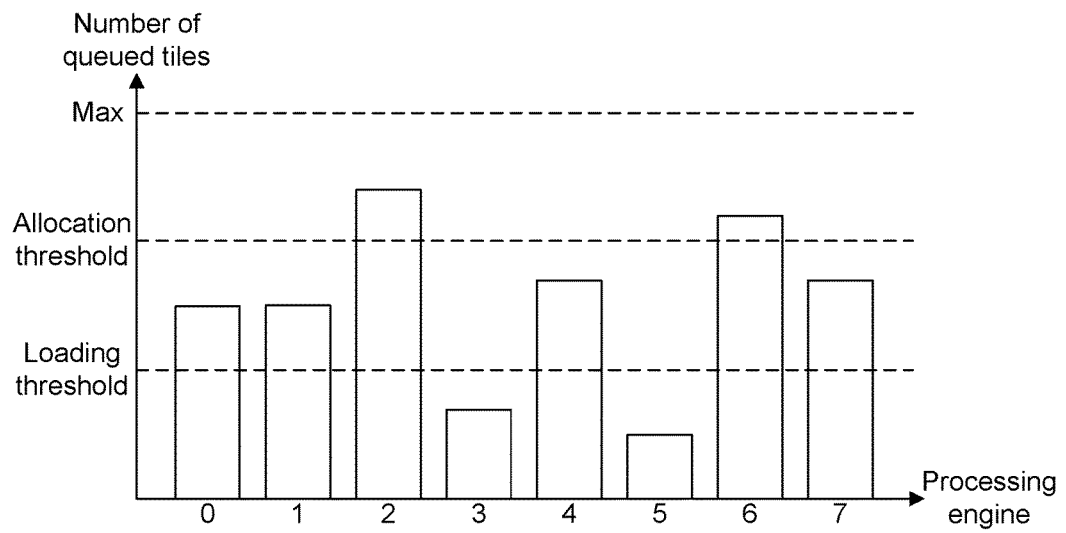
FIG. 10 illustrates a third state of the queues of tiles allocated to the processing engines.

If at least one of the queues 228 is greater than the allocation threshold then a block of tiles is not allocated to the processing engines at that time. In this case, the method passes from step S804 to step S806. In step S806 the tile allocation unit 224 (e.g. the allocation logic 226) determines whether any of the queues are below the loading threshold. In other words, in step S806, the tile allocation unit 224 (e.g. the allocation logic 226) determines whether the number of allocated tiles in any of the queues is below the loading threshold. If in step S806 it is detected that the number of allocated tiles in any of the queues 228 is less than the loading threshold, then the method passes to step S808. In step S808 the tile allocation unit 224 allocates tiles to the processing engines in the load balancing allocation mode. As described above, in the load balancing allocation mode, tiles may be allocated to processing engines with a view to balancing the load across the different processing engines. In particular, a different number of tiles may be allocated to different processing engines in the load balancing allocation mode. FIG. 10 shows an example in which at least one of the queues (queues 3 and 5) are below the loading threshold, such that the method passes from step S806 to step S808 so that tiles are allocated to the processing engines 216 in the load balancing allocation mode.

The amount of work involved in processing a tile may be different for different tiles, and is highly dependent upon the application that is being run. For example, a game application may often use images where a greater level of detail is found in some regions (e.g. the centre) of the images compared to other regions (e.g. the edges) of the images, such that the processing of the central tiles involves more work than the processing of the edge tiles of the rendering space. For other applications, e.g. for rendering a user interface (UI), the level of detail may be approximately constant across the whole image, such that the processing of all of the tiles involves approximately the same amount of work. Differences in the amount of processing performed on different tiles may result in some processing engines lagging behind other processing engines in terms of the number of tiles that they have processed. Over time these differences can result in significant differences in the number of tiles that are queued for the different processing engines 216. This can lead to a situation in which one or more of the queues falls below the loading threshold whilst a different one or more of the queues is above the allocation threshold. It is in this case that the load balancing allocation mode is invoked to address the imbalance in the computational load currently queued for the different processing engines 216.

The number of tiles that are allocated in step S808 may be different in different examples. For example, in response to detecting in step S806 that the number of allocated tiles in any of the queues is below the loading threshold, in step S808 the tile allocation unit 224 may allocate sufficient tiles to the processing engines 216 in the load balancing allocation mode to fill each of the queues, i.e. bring all of the queues up to the Maximum line. This is a simple way to ensure that the number of tiles currently in the queue for each of the processing engines is the same.

In another example, in step S808 the tile allocation unit 224 may identify the maximum number of tiles currently in any of the queues and may allocate tiles to processing engines 216 such that all of the queues have the identified number of tiles. This is another way to ensure that the number of tiles allocated to each of the processing engines is the same. This may involve allocating fewer tiles in the load balancing mode compared to bringing all of the queues up to the maximum queue occupancy. Allocating fewer tiles in the load balancing mode may mean that more tiles can be allocated in the spatial allocation mode, which can improve the cache efficiency as described above.

In another example, in step S808 the tile allocation unit 224 may allocate tiles to processing engines 216 such that all of the queues have at least a number of tiles equal to the allocation threshold. In yet another example, in step S808 the tile allocation unit 224 may allocate tiles to processing engines 216 such that all of the queues have at least a number of tiles equal to the loading threshold. These examples may result in even fewer tiles being allocated in the load balancing mode, but they may result in step S808 being performed more often than in the other previously described examples.

In some examples, step S808 may involve allocating a block of tiles to the processing engines in a load balancing manner (e.g. allocating a different number of tiles from the block to different processing engines). This means that when the allocation mode switches back to the spatial allocation mode, a whole number of blocks of tiles have been already allocated, which can simplify the process of switching back to the spatial allocation mode.

If in step S806 it is determined that none of the queues are below the loading threshold (e.g. if the queues are in the state shown in FIG. 7) then the method passes to step S804. Also, following step S808 the method passes to step S804. The method ends when there are no more tiles to allocate to the processing engines 216.

In the examples described above, the spatial allocation mode is used to improve the cache efficiency unless the processing of the tiles is imbalanced to the extent that one or more of the processing engines risks becoming idle before a different one or more of the processing engines are ready for a new block of tiles to be allocated in the spatial allocation mode. In that case, the load balancing allocation mode is used to prevent processing engines becoming idle. So in the trade-off between cache efficiency (achieved by using the spatial allocation mode) and load balancing (achieved by using the load balancing allocation mode) the tile allocation unit 224 aims for cache efficiency unless the loads are imbalanced by more than a threshold (set by the loading threshold), at which point load balancing takes priority over the cache efficiency. Therefore, at this point the tile allocation unit 224 switches to operate in the load balancing mode. However, once the loads have been re-balanced, the tile allocation unit 224 may then switch back to the spatial allocation mode to maintain the cache efficiency. So if the work involved in processing each tile is approximately the same, then the tile allocation unit 224 may be able to predominantly (possibly exclusively) operate in the spatial allocation mode; whereas, if the work involved in processing each tile is significantly different for different tiles, then the tile allocation unit 224 may switch to the load balancing allocation mode more frequently to ensure that the loads are balanced across the different processing engines and to prevent any of the processing engines becoming idle.

Figure 11A:
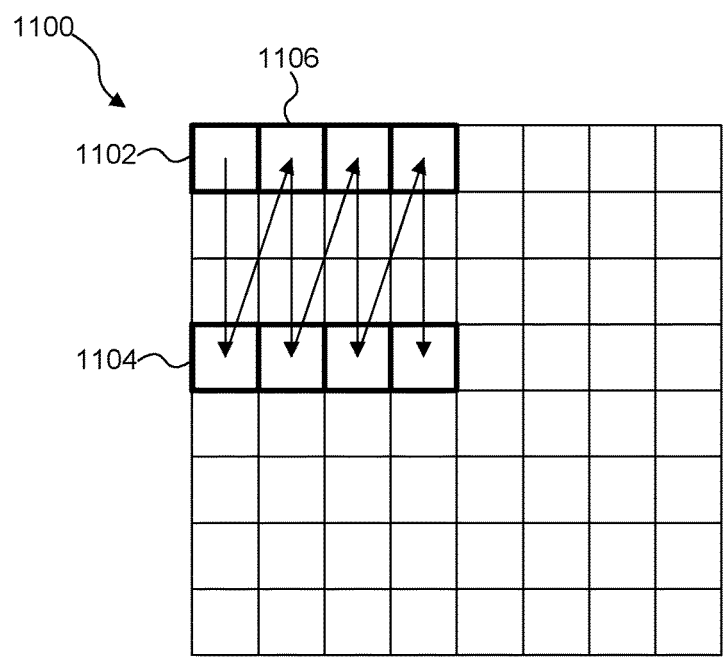
FIG. 11a shows a first order in which blocks of tiles may be processed.

FIG. 5 shows one block of tiles 500 to be allocated to the processing engines 216 in one allocation process. The rendering space may include many blocks of tiles. For example, FIG. 11a shows a rendering space 1100 which comprises 64 blocks of tiles, in an 8×8 arrangement. Three of the blocks of tiles are denoted with reference numerals 1102, 1104 and 1106. Each of the blocks of tiles may be a 4×4 block of tiles, such as block 500 shown in FIG. 5. The tile allocation unit 224 can process the blocks of tiles in a sequence. FIG. 11a shows a sequence whereby block 1102 is processed first, then the next three blocks from the first column of blocks (ending with block 1104) are processed in sequence. Then block 1106 is processed and the next three blocks from the second column are subsequently processed. The processing sequence can follow the pattern shown in FIG. 11a (e.g. according to a space filling curve, such as according to Morton order or a Hilbert curve) until the first four blocks from each of the columns have been processed. Then the sequence repeats for the bottom four blocks from each column until all of the blocks of tiles in the rendering space 1100 have been processed. In this example, just four blocks are processed from each column before moving to the next column, with a view of maintaining a degree of spatial locality between consecutively processed blocks of tiles, i.e. the difference in spatial location between two consecutively processed blocks is kept relatively small (compared to processing a whole column before moving to the next column), thereby increasing the likelihood that the contents of the cache after processing one block may be useful for processing the next block.

Although the jumps in spatial location between consecutively processed blocks of tiles may be relatively small in the example shown in FIG. 11a, there is a discontinuity in spatial location between consecutive blocks of tiles to be processed in the sequence at the first, fourth, fifth and eighth block from each column of blocks. Discontinuities such as these mean that data stored in the cache system 218 for one block may be less likely to be useful for the processing of the next block in the sequence, such that the cache hit rate might decrease when there are discontinuities in the sequence of blocks that are processed.

Figure 11B:
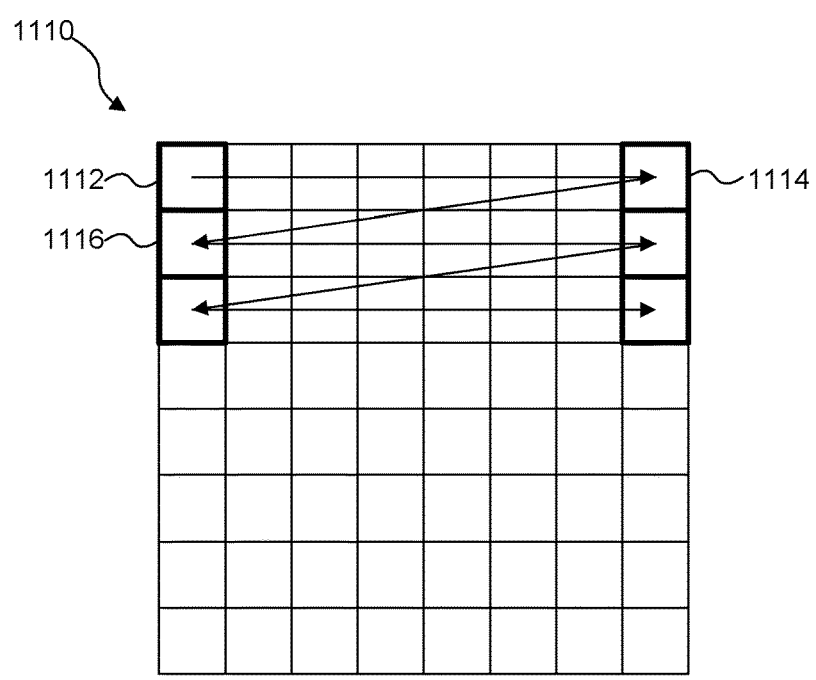
FIG. 11b shows a second order in which blocks of tiles may be processed.

To address this issue, the sequence in which the tile allocation unit 224 processes the blocks of tiles may be in raster scan order. For example, FIG. 11b shows a rendering space 1110 which comprises 64 blocks of tiles, in an 8×8 arrangement. Three of the blocks of tiles are denoted with reference numerals 1112, 1114 and 1116. Each of the blocks of tiles may be a 4×4 block of tiles, such as block 500 shown in FIG. 5. The tile allocation unit 224 can process the blocks of tiles in raster scan order, such that the block 1112 is processed first, then the rest of the blocks of the first row are processed, ending with block 1114. Then the blocks of the next row of blocks are processed, starting with block 1116. Each row of blocks is processed in turn until all of the blocks of tiles in the rendering space 1110 have been processed.

With the sequence shown in FIG. 11b, there is a discontinuity in spatial location between consecutive blocks of tiles to be processed in the sequence at the first and eighth block from each row of blocks. This means that there are fewer discontinuities with the sequence shown in FIG. 11b compared to with the sequence shown in FIG. 11a. Fewer discontinuities means that the cache hit rate might be increased. The best order for processing blocks of tiles may depend upon the content of the data being processed.

In another example, the rows of blocks may be processed in sequence (similar to as shown in FIG. 11b), but alternate rows may be processed in reverse order (i.e. from right to left), i.e. the blocks may be processed in boustrophedon order. This would further reduce the number of discontinuities in the sequence in which blocks are processed.

In general, the sequence in which the tile allocation unit 224 processes the blocks of tiles may be in any suitable order, e.g. a constrained order defined within the system.

Figure 12:
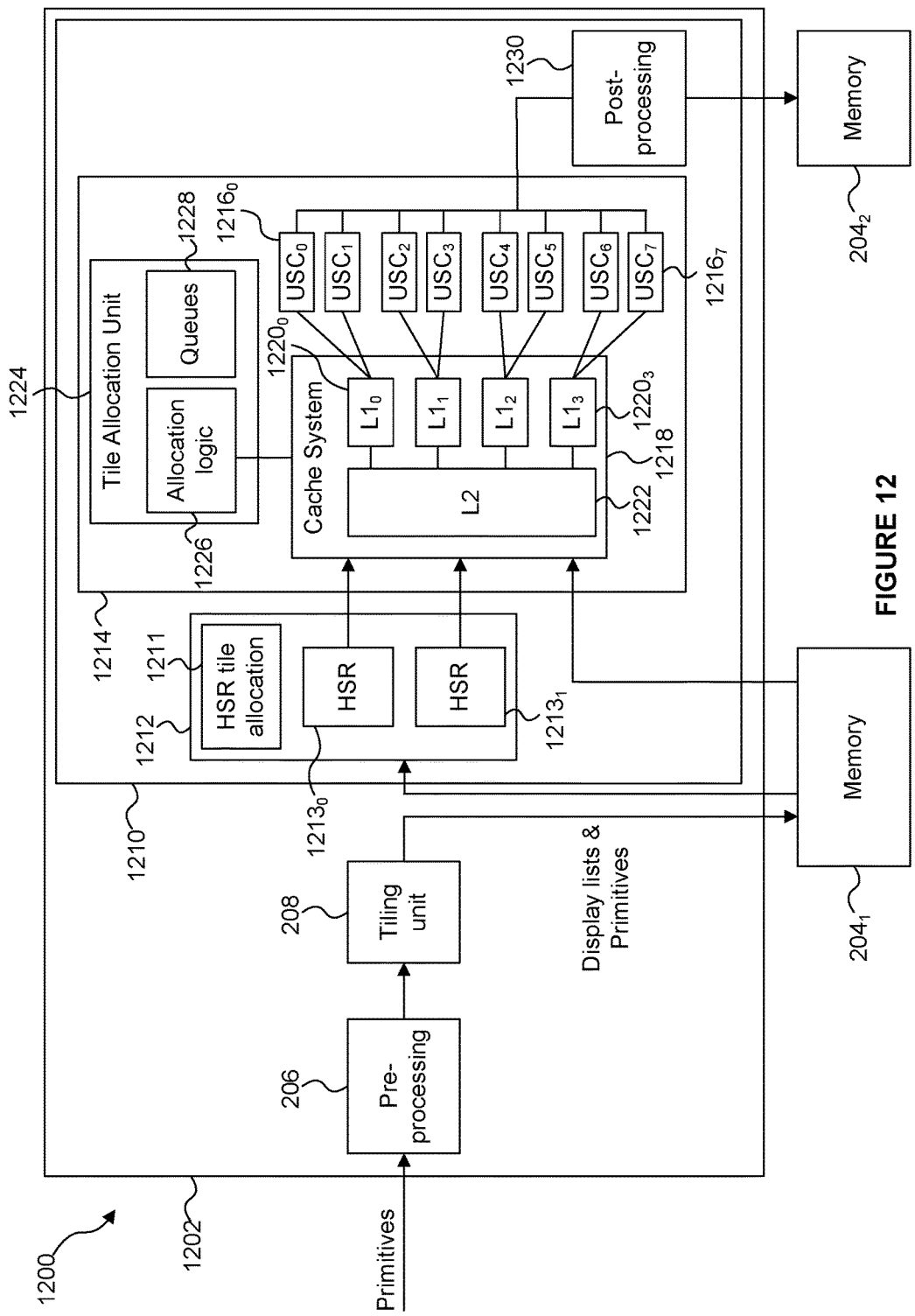
FIG. 12 shows a graphics processing system according to a further example.
Figure 13:
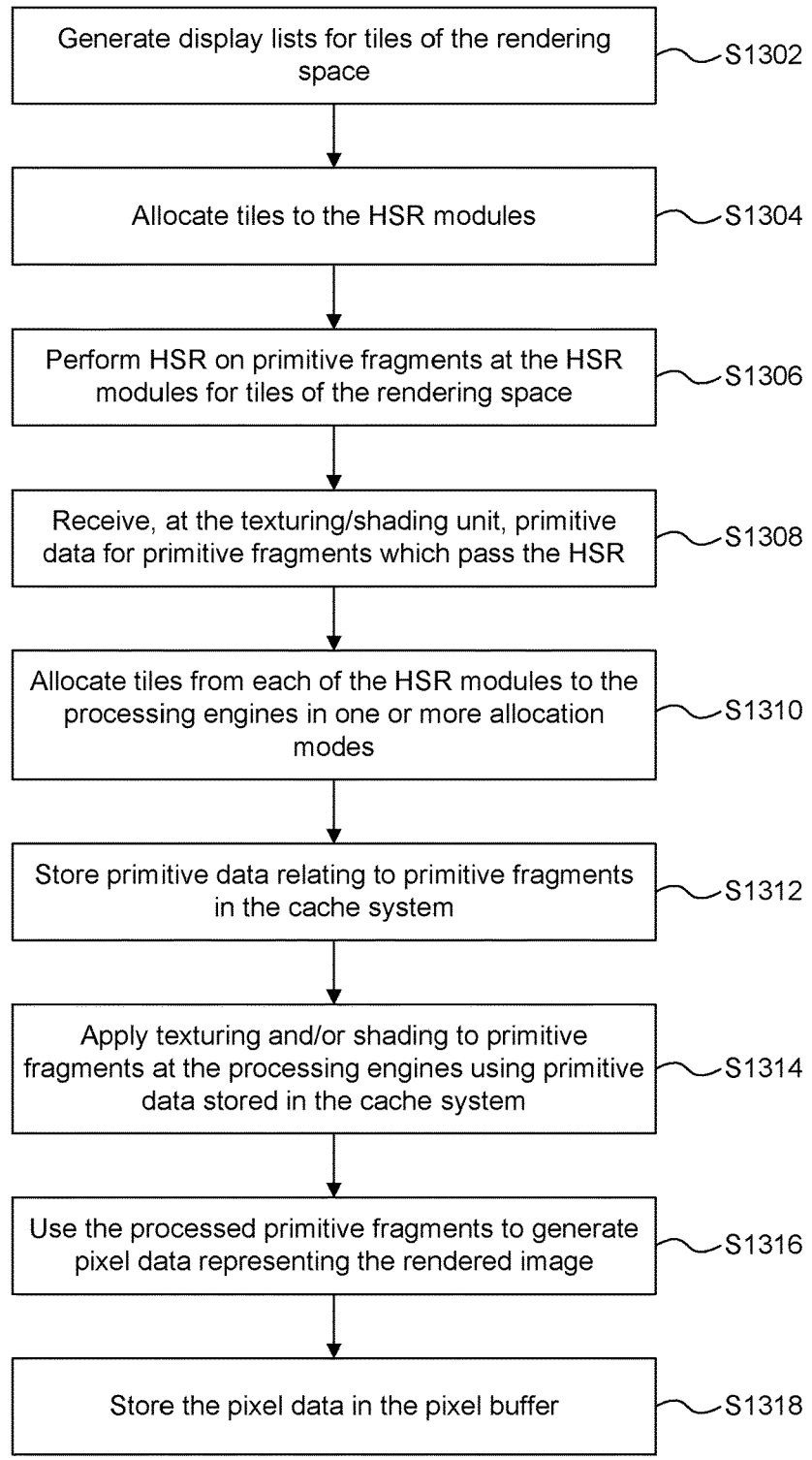
FIG. 13 is a flow chart showing a method of processing primitive fragments in the graphics processing system of the further example.

FIG. 12 shows a further example of a graphics processing system 1200, which may be embodied in hardware (e.g. on an integrated circuit), in software or a combination of both. The graphics processing system 1200 is similar to the graphics processing system 200 described above. However, in the graphics processing system 1200 there are multiple HSR modules within the HSR unit. The allocation of tiles to processing engines is split into two stages: in a first stage tiles are allocated to a HSR module, and in a second stage tiles from a HSR module are allocated to processing engines. In this way, tiles are allocated to processing engines on a per-HSR module basis after the HSR has been performed.

In particular, the graphics processing system 1200 comprises a graphics processing unit (GPU) 1202 and two portions of memory $204_1$ and $204_2$. Common reference numerals are used in FIGS. 2 and 12 for components which are the same. The GPU 1202 comprises a pre-processing module 206, a tiling unit 208 and a rasterization module 1210, wherein the rasterization module 1210 comprises a hidden surface removal (HSR) unit 1212, a texturing/shading unit 1214 and a post-processing module 1230. The HSR unit 1212 comprises a HSR tile allocation unit 1211 and a plurality of HSR modules $1213_0$ and $1213_1$. In the example shown in FIG. 12 there are two HSR modules 1213, but in other examples there may be more than two HSR modules 1213 in the HSR unit 1212. The HSR modules can perform HSR on different tiles in parallel. The texturing/shading unit 1214 comprises a plurality of processing engines 1216, each of which is configured to apply one or both of texturing and shading to primitive fragments. The texturing/shading unit 1214 also comprises a cache system 1218 which is configured to store graphics data relating to primitive fragments. The cache system 1218 is a multi-level cache and corresponds to the cache system 218 described above. The cache system 1218 comprises a plurality of level 1 cache subsystems 1220 and a level 2 cache 1222. Each of the cache subsystems 1220 is coupled to a set of processing engines 1216. In the example shown in FIG. 12 there are four level 1 cache subsystems $1220_0$ to $1220_3$. The texturing/shading unit 1214 also comprises a tile allocation unit 1224 which comprises allocation logic 1226 and a set of queues 1228 for storing indications of tiles which are allocated to the processing engines. The HSR allocation unit 1211 and the tile allocation unit 1224 provide the two stages of the tile allocation in the system 1200. The operation of the HSR tile allocation unit 1211 and the tile allocation unit 1224 are described in the context of the operation of the graphics processing system 1200 which is described with reference to the flow chart shown in FIG. 13.

In step S1302, a geometry processing phase is implemented in the same way as described above, such that the tiling unit 208 generates display lists (or control streams) for the tiles of the rendering space. The display lists and the primitives are outputted from the tiling unit 208 and stored in the memory $204_1$.

In the rasterisation phase, the display lists and graphics data for the primitives is provided to the rasterisation module 1210. In step S1304 the HSR tile allocation unit 1211 allocates tiles to the HSR modules $1213_0$ and $1213_1$. In step S1306 the HSR modules $1213_0$ and $1213_1$ of the HSR unit 1212 perform hidden surface removal on primitive fragments for tiles of the rendering space.

In step S1308, the texturing/shading unit 214 receives graphics data for primitive fragments which pass the HSR performed by the HSR modules 1213 of the HSR unit 1212.

In step S1310, on a per-HSR module basis, the tile allocation unit 1224 allocates tiles to the processing engines in one or more allocation modes. The allocation modes may, for example, include the spatial allocation mode and the load balancing allocation mode described above.

Steps S1312 to S1318 correspond to steps S410 to S416 described above. Therefore, in step S1312, the graphics data for the primitives which are present in a tile is stored in the cache system 1218. In particular, the graphics data for the primitives which are present in a tile is stored in the cache subsystem 1220 coupled to the processing engine(s) 1216 to which the tile has been allocated. In step S1314 the processing engines 1216 process primitive fragments by applying one or both of texturing and shading to the primitive fragments. The processing engines 1216 use the graphics data stored in the cache system 1218 to process the primitive fragments. In step S1316 the post-processing module 1230 can apply post-processing steps such as filtering, compression, format conversion, gamma compression, colour space conversion or format packing to the processed primitive fragments outputted from the texturing/shading unit 1214 to generate pixel data representing a rendered image. In step S1318 the pixel data (which may be compressed) is outputted from the post-processing module 1230 and stored, e.g. in a pixel buffer in the memory $204_2$.

In the examples described above, the cache system 218 (or cache system 1218) comprises a level 2 cache 222 and four level 1 cache subsystems $220_0$ to $220_3$. In other examples, the cache system might not include a level 2 cache or might include more than two levels within the cache hierarchy. Furthermore, other examples may include a different number of L1 cache subsystems and/or processing engines. For example, a cache subsystem may be coupled to more than two processing engines. Furthermore, not all cache subsystems within the cache system are necessarily coupled to more than one processing engine. Furthermore, each processing engine could be coupled to more than one of the cache subsystems. In the examples described above the blocks of tiles are 4×4 blocks of tiles (e.g. block 500), but more generally the blocks of tiles may be any suitable size and/or shape. For example, the blocks of tiles may be 6×2 blocks of tiles. In that case, there may be twelve processing engines such that when a block of tiles is allocated, one tile from the block can be allocated to each of the processing engines.

Figure 14:
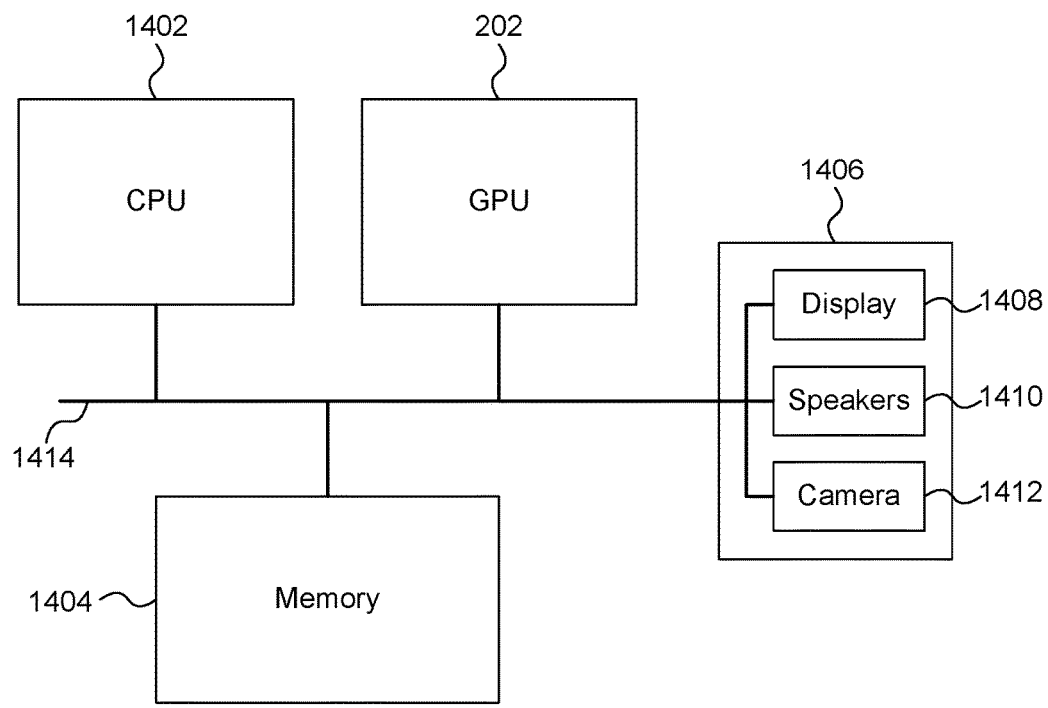
FIG. 14 shows a computer system in which a graphics processing system is implemented.

FIG. 14 shows a computer system in which the graphics processing system 200 or 1200 may be implemented. The computer system comprises a CPU 1402, the GPU 202, a memory 1404 (which may include the memories $204_1$ and $204_2$) and other devices 1406, such as a display 1408, speakers 1410 and a camera 1412. The components of the computer system can communicate with each other via a communications bus 1414. As an example, applications may execute on the CPU 1402 and may send data to the GPU 202 for rendering images which can be stored in the memory 1404 and/or displayed on the display 1408.

Generally, any of the functions, methods, techniques or components described above (e.g. the components of the graphics processing system 202) can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation, the module, functionality, component or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods described herein may be carried out by a dedicated circuit, an application-specific integrated circuit, a programmable logic array, a field-programmable gate array, or the like. For example, the module, functionality, component, unit or logic (e.g. the components of the graphics processing system 202) may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, unit or logic (e.g. the components of the graphics processing system 202) may include circuitry that is fixed function and circuitry that can be programmed to perform a function or functions; such programming may be provided from a firmware or software update or control mechanism. In an example, hardware logic has circuitry that implements a fixed function operation, state machine or process.

Figure 15:
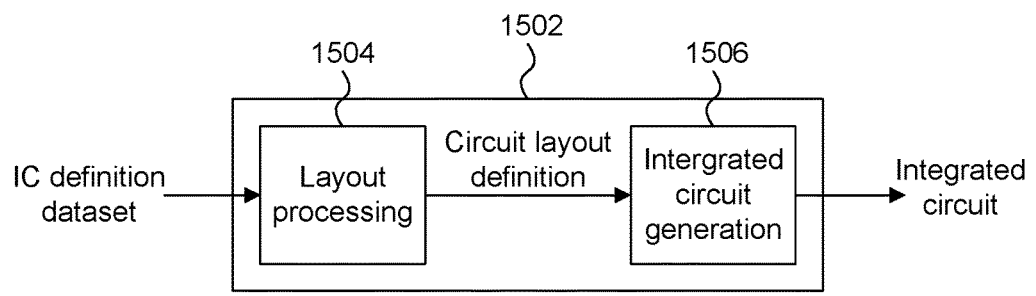
FIG. 15 shows an integrated circuit manufacturing system for generating an integrated circuit embodying a graphics processing system.

It is also intended to encompass software which "describes" or defines the configuration of hardware that implements a module, functionality, component, unit or logic (e.g. the components of the graphics processing system 202) described above, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing system configured to perform any of the methods described herein, or to manufacture a graphics processing system comprising any apparatus described herein. The IC definition dataset may be in the form of computer code, e.g. written in a suitable HDL such as register-transfer level (RTL) code. FIG. 15 shows an example of an integrated circuit (IC) manufacturing system 1502 which comprises a layout processing system 1504 and an integrated circuit generation system 1506. The IC manufacturing system 1502 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 1502 to manufacture an integrated circuit embodying a graphics processing system as described in any of the examples herein. More specifically, the layout processing system 1504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1504 has determined the circuit layout it may output a circuit layout definition to the IC generation system 1506. The IC generation system 1506 generates an IC according to the circuit layout definition, as is known in the art. For example, the IC generation system 1506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1506 may be in the form of computer-readable code which the IC generation system 1506 can use to form a suitable mask for use in generating an IC. The different processes performed by the IC manufacturing system 1502 may be implemented all in one location, e.g. by one party. Alternatively, the IC manufacturing system 1502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

The term 'processor' and 'computer' are used herein to refer to any device, or portion thereof, with processing capability such that it can execute instructions, or a dedicated circuit capable of carrying out all or a portion of the functionality or methods, or any combination thereof.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

What is claimed is:

1. A graphics processing system configured to process primitive fragments using a rendering space which is subdivided into a plurality of tiles, the system comprising:
   a plurality of processing engines; and
   a tile allocation unit configured to operate in a plurality of allocation modes to allocate tiles to the processing engines, wherein the plurality of allocation modes includes a spatial allocation mode and a load balancing allocation mode;
   wherein the tile allocation unit is configured to maintain, for each of the processing engines, a queue of allocated tiles which are allocated for processing by that processing engine, and wherein the tile allocation unit is configured to monitor the state of the queues to determine an allocation mode in which tiles are to be allocated to the processing engines.

2. The graphics processing system of claim 1, wherein the processing engines are configured to apply one or both of texturing and shading to primitive fragments.

3. The graphics processing system of claim 1, wherein there is a maximum to the number of tiles which can be allocated to a processing engine at any given time.

4. The graphics processing system of claim 1, wherein the tile allocation unit is configured to use two thresholds to the number of tiles in the queues to control the allocation mode in which the tile allocation unit operates, wherein the two thresholds are an allocation threshold and a loading threshold.

5. The graphics processing system of claim 4, wherein the allocation threshold is greater than the loading threshold.

6. The graphics processing system of claim 4, wherein said allocation threshold and said loading threshold are fixed, and wherein a maximum to the number of tiles which can be allocated to a processing engine at any given time is fixed.

7. The graphics processing system of claim 4, wherein there is a maximum to the number of tiles which can be allocated to a processing engine at any given time, and wherein at least one of said maximum to the number of tiles, said allocation threshold and said loading threshold is variable.

8. The graphics processing system of claim 4, wherein the tile allocation unit is configured to, responsive to detecting that the number of allocated tiles in each of the queues is not greater than the allocation threshold, implement an allocation process in the spatial allocation mode to thereby allocate a block of tiles to the processing engines, thereby allocating to each of said plurality of processing engines, a respective one or more tiles from the block of tiles.

9. The graphics processing system of claim 4, wherein the tile allocation unit is configured to, responsive to detecting that the number of allocated tiles in any of the queues is below the loading threshold, allocate tiles to the processing engines in the load balancing allocation mode.

10. The graphics processing system of claim 9, wherein the tile allocation unit is configured to, responsive to detecting that the number of allocated tiles in any of the queues is below the loading threshold:
   allocate sufficient tiles to the processing engines in the load balancing allocation mode to fill each of the queues;
   identify the maximum number of tiles currently in any of the queues, and allocate tiles to processing engines such that all of the queues have the identified number of tiles;
   allocate tiles to processing engines in the load balancing allocation mode such that all of the queues have at least a number of tiles equal to the allocation threshold; or
   allocate tiles to processing engines in the load balancing allocation mode such that all of the queues have at least a number of tiles equal to the loading threshold.

11. The graphics processing system of claim 9, wherein the tile allocation unit is configured to allocate a block of tiles to the processing engines in one allocation process in the load balancing allocation mode.

12. The graphics processing system of claim 1, wherein, in the load balancing allocation mode, tiles are allocated to the processing engines based on computational loads of the processing engines.

13. The graphics processing system of claim 1, wherein the tile allocation unit is configured, when operating in the load balancing allocation mode, to determine when the loads have been rebalanced, and responsive thereto switch to the spatial allocation mode.

14. The graphics processing system of claim 1, further comprising a cache system configured to store graphics data for use in processing the primitive fragments, the cache system including a plurality of cache subsystems, wherein each of said plurality of cache subsystems is coupled to a respective set of one or more of the processing engines.

15. The graphics processing system of claim 14, wherein, in the spatial allocation mode, groups of spatially adjacent tiles are allocated to the processing engines according to a spatial allocation scheme, said spatial allocation scheme ensuring that each of said groups of spatially adjacent tiles is allocated to a set of processing engines which are coupled to the same cache subsystem.

16. The graphics processing system of claim 1, wherein the graphics processing system is configured to render an image, and wherein the processing engines are configured to output processed primitive fragments for use in generating pixel data representing the rendered image.

17. The graphics processing system of claim 1, further comprising a hidden surface removal unit configured to perform hidden surface removal on the primitive fragments, wherein the hidden surface removal unit comprises a plurality of hidden surface removal modules and a Hidden Surface Removal (HSR) tile allocation unit configured to allocate tiles to the hidden surface removal modules.

18. A method of processing primitive fragments in a graphics processing system using a rendering space which is sub-divided into a plurality of tiles, the method comprising:
   processing primitive fragments at a plurality of processing engines;
   allocating, in a plurality of allocation modes, tiles to the processing engines, wherein the plurality of allocation modes includes a spatial allocation mode and a load balancing allocation mode;
   maintaining, for each of the processing engines, a queue of allocated tiles which are allocated for processing by that processing engine; and
   monitoring the state of the queues to determine an allocation mode in which tiles are to be allocated to the processing engines.

19. The method of claim 18, wherein there is a maximum to the number of tiles which can be allocated to a processing engine at any given time, and wherein said monitoring the state of the queues to determine an allocation mode in which tiles are to be allocated to the processing engines comprises using two thresholds to the number of tiles in the queues to control the allocation mode in which tiles are to be allocated to the processing engines, wherein the two thresholds are an allocation threshold and a loading threshold, and wherein the allocation threshold is greater than the loading threshold.

20. A non-transitory computer readable storage medium having stored thereon a computer readable description of an integrated circuit that, when processed in an integrated circuit manufacturing system, causes the integrated circuit manufacturing system to manufacture a graphics processing system which is configured to process primitive fragments using a rendering space which is sub-divided into a plurality of tiles, the graphics processing system comprising:
   a plurality of processing engines; and
   a tile allocation unit configured to operate in a plurality of allocation modes to allocate tiles to the processing engines, wherein the plurality of allocation modes includes a spatial allocation mode and a load balancing allocation mode;
   wherein the tile allocation unit is configured to maintain, for each of the processing engines, a queue of allocated tiles which are allocated for processing by that processing engine, and wherein the tile allocation unit is configured to monitor the state of the queues to determine an allocation mode in which tiles are to be allocated to the processing engines.

* * * * *